United States Patent [19]

Ohnuki et al.

[11] 4,283,131
[45] Aug. 11, 1981

[54] MANUAL FOCUS SETTING APPARATUS FOR PHOTOGRAPHIC CAMERA HAVING AUTOMATIC FOCUS ADJUSTING MECHANISM

[75] Inventors: Mitsuo Ohnuki; Masashi Yamada, both of Hachioji, Japan

[73] Assignee: Konishiroku Photo Industry Co., Ltd., Tokyo, Japan

[21] Appl. No.: 29,035

[22] Filed: Apr. 11, 1979

[30] Foreign Application Priority Data

Apr. 12, 1978 [JP] Japan .............. 53-47024[U]

[51] Int. Cl.³ .................................................. G03B 3/00
[52] U.S. Cl. ..................................................... 354/195
[58] Field of Search .............. 354/25, 195, 198, 289, 354/47, 163, 196, 197, 199-201; 352/139, 140; 350/247, 255

[56] References Cited

U.S. PATENT DOCUMENTS

| 3,048,092 | 8/1962 | Gottschalk | 354/195 |
| 3,274,914 | 9/1966 | Biedermann et al. | 354/25 |
| 3,617,128 | 11/1971 | Harvey | 354/163 X |
| 4,079,387 | 3/1978 | Kawamura et al. | 354/289 X |

FOREIGN PATENT DOCUMENTS

53-44021  4/1978  Japan ................................ 354/25

*Primary Examiner*—L. T. Hix
*Assistant Examiner*—William B. Perkey
*Attorney, Agent, or Firm*—Finnegan, Henderson, Farabow, Garrett & Dunner

[57] ABSTRACT

A manual focus setting apparatus for a camera having an automatic focus adjusting or focusing apparatus including an actuator which moves simultaneously or in synchronism with movement of a focusing lens along its optical axis and is stopped in response to a signal from an electromagnet. A focus setting member is manually movable from a position clear of the path of a stopper projection on the actuator to a position where it can engage the stopper projection to limit movement of the actuator. Switch means is provided which is operable in response to movement of the focus setting member to the stopper projection engaging position to inhibit operation of the electromagnet.

3 Claims, 3 Drawing Figures

MANUAL FOCUS SETTING APPARATUS FOR PHOTOGRAPHIC CAMERA HAVING AUTOMATIC FOCUS ADJUSTING MECHANISM

BACKGROUND OF THE INVENTION

1. Field of the Invention

The present invention relates in general to a photographic camera having an automatic focus adjusting or focus apparatus (which will be referred to simply as AF camera hereinafter), and in particular concerns a manual focus setting apparatus for AF cameras which allows the focal point to be set manually independently from a ranging apparatus adapted to measure distance to an object to be photographed for the automatic focal adjustment.

2. Description of the Prior Art

There has been hitherto known the AF camera in which a lens barrel provided with a helicoid screw for effecting the movement of a focusing lens along the optical axis thereof, and a focusing ring interlocked with the lens barrel and meshed with a gear for controlling the movement of the focusing lens as well as an actuator member provided with ratchet gear means for controlling rotation thereof in cooperation with a ratchet in response to operation of an electro-magnet are driven in one direction by driving means such as springs, wherein the movement of the actuator member is stopped through engagement of the ratchet with the ratchet gear means, which ratchet in turn is operated by the electro-magnet controlled by a focusing signal produced from the ranging device when the distance to the object to be photographed is detected as the result of the ranging scanning operation in correspondence to the movement of the focusing lens, thereby to effect automatically the focal adjustment of the focusing lens. With such AF camera, photographs focused to the aimed objects can be conveniently taken without requiring focusing manipulations on the basis of the judgement of the user. However, in the case where a unique effect is to be produced by making use of the out-of-focus condition (defocused condition) intentionally in accordance with a mind of user or when the object to be photographed is overcapability of the ranging device (i.e. the device for measuring distance to the object) such as objects of low contrast or such as objects of a repetition of simple identical patterns, for example, there may arise a problem that the focal point can not be automatically set in accordance with the distance to the object to be photographed.

SUMMARY OF THE INVENTION

Accordingly, an object of the present utility model is to provide a manual focus setting apparatus for AF camera which allows the focal distance to be manually set in accordance with the intention of the user.

An object of this invention which relates to a manual focus setting device for AF cameras, wherein the focusing distance or range to objects to be photographed is obtainable in accordance with a mind of the user. The present invention teaches that a stopper projection is provided for the actuator member for the focus setting, while a manual focus setting member which is releasably engageable with the stopper projection is provided at a position to limit the displacement of the actuator member such that the actuator member is stopped through the engagement between the stopper projection and the manual focus setting member thereby to set the focal distance of the focusing lens in accordance with the displacement of the actuator member, and switch means is provided which is adapted to inhibit the electromagnet from being operated in response to the focusing signal produced from a ranging device for the automatic focus adjustment when the manual focus setting member is operated.

The novel features and advantages of the invention will become more apparent from detailed description of the preferred embodiment thereof taken in conjunction with the accompanying drawings.

DETAILED DESCRIPTION OF THE PREFERRED EMBODIMENT

Figure 1:
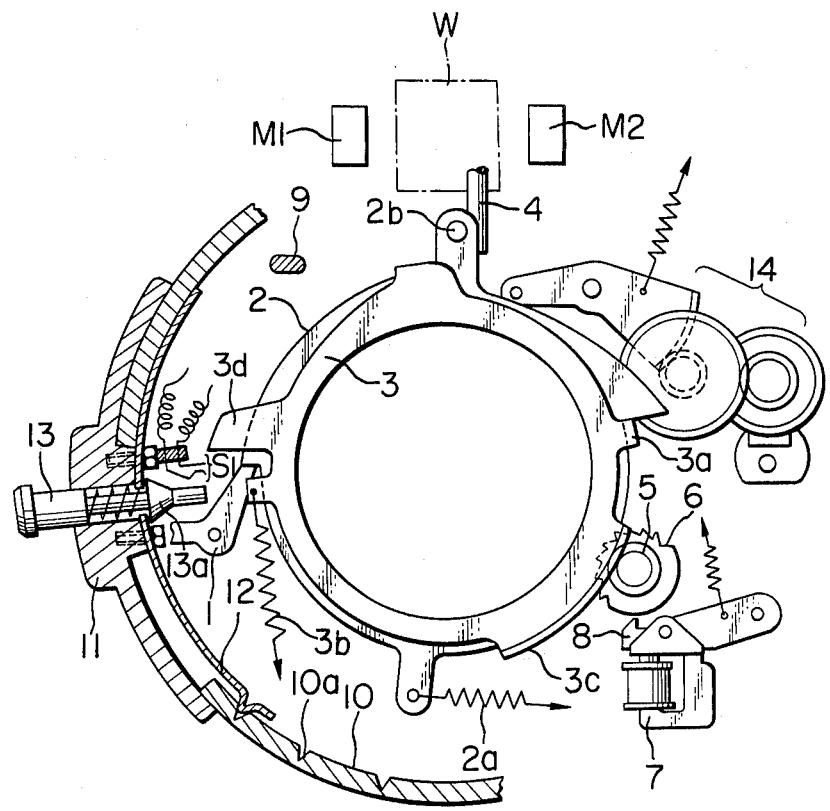
FIG. 1 is a schematic front view of a mechanism according to an exemplary embodiment of the present invention.

Referring to FIG. 1, when a shutter release button (not shown) is depressed, a latch lever 1 is caused to rotate in the counter-clockwise direction and disengaged from a charging ring 2 which will be then rotated in the counter-clockwise direction under the influence of a compression spring 2a. Consequently, an actuator ring 3 which is engaged with the charging ring 2 through a projection 3a and adapted to effect displacement of a focusing lens (not shown) along the optical axis by means of a helicoidal screw or the like is also rotated in the counterclockwise direction under the force of a spring 3b. A mirror drive lever 4 engaged with the charging ring 2 through an arm pin 2b thereof and adapted to move a movable mirror M1 is correspondingly swung thereby to allow the distance measuring operation, i.e. the ranging scanning operation to be performed through the rotation of the movable mirror M1. When light images from the movable mirror M1 and a stationary mirror M2 coincide with each other at a photo-sensitive element (not shown), a focusing signal is produced as an output signal from an electric circuit of a ranging device W. The actuator ring 3 is integrally formed with teeth 3c which is meshed with a pinion 5 adapted to be rotated simultaneously with a ratchet wheel 6. On the other hand, the electro-magnet 7 which is controlled by the output focusing signal from the ranging device W is adapted to operate a ratchet 8. Thus, when the actuator ring 3 has attained a focused position corresponding to the distance to an object to be photographed as detected by the ranging device, the ratchet 8 is actuated by the electro-magnet 7 to be engaged with the ratchet wheel 6, resulting in that the actuator ring 3 is stopped at the focused position. Nevertheless, the charging ring 2 continues to be rotated in the counterclockwise direction, whereby a shutter release pin 9 is depressed by the arm pin 2b. In this manner, the photographing operation is carried out in the automatic focusing photographic camera or AF camera.

When it is desired to take a picture with the focusing lens being set at a desired focal distance in the AF camera described above, a distance setting member 11 mounted slidably in the peripheral direction of a lens barrel 10 is moved manually to a desired one of setting positions for presetting by grooves 10a and a click spring 12 attached to the distance setting member 11 and subsequently the shutter button is actuated after a manual focus setting member 13 has been depressed. In the depressed position of the manual focus setting member 13, a tip end thereof will bear up against a latch projection 3d formed in the actuator ring 3 to inhibit further rotation of the actuator ring 3. Concurrently, a switch actuator member 13a formed in the manual focus setting member 13 is operated to close a switch S1, as the result of which the electro-magnet 7 is inhibited from being operated in response to the focusing signal from the ranging device. Consequently, the rotation of the actuator ring 3 brought about by the counter-clockwise rotation of the charging ring 2 in response to the depression of the shutter button is not prevented by the ratchet 8 at this time but continues until the stopper projection 3d impinges against the tip end of the manual focus setting member 13. In this manner, photographing is carried out at the set position of the manual focus setting member 13, i.e. at the focal distance set by the distance setting member 11. In FIG. 1, reference numeral 14 denotes a speed adjusting mechanism for controlling the speed at which the charging ring 2 is rotated in the counter-clockwise direction.

Figure 2:
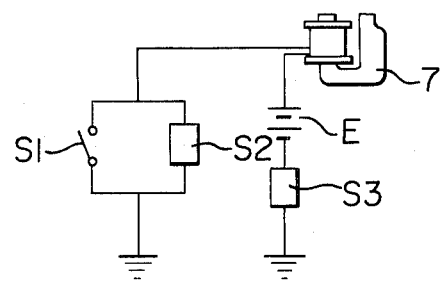
FIG. 2 is a block diagram showing an exemplary embodiment of a control circuit for an electro-magnet of an automatic focus adjusting system.
Figure 3:
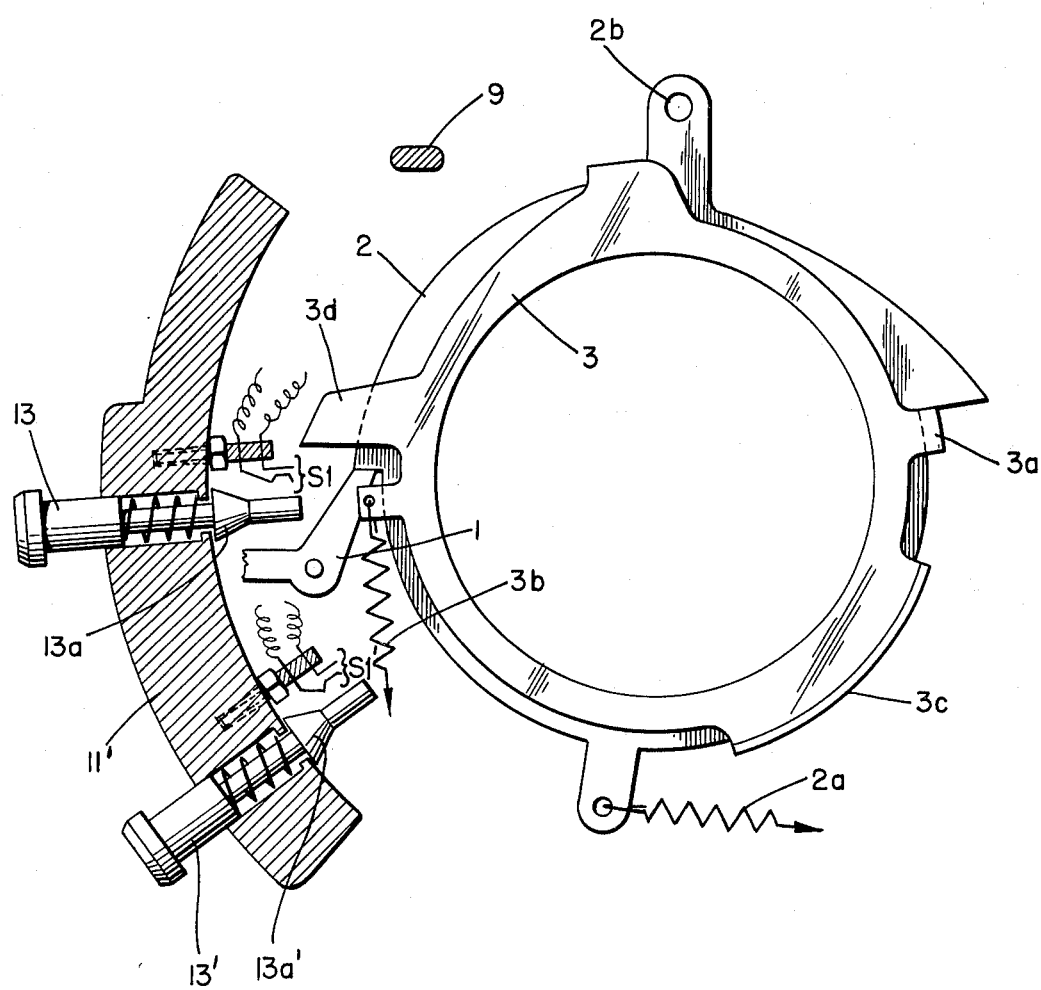
FIG. 3 is a view similar to a portion of FIG. 1 and showing a modified form of the invention.

FIG. 2 shows a circuit arrangement to inhibit the energization of the electro-magnet 7 in response to the output signal from the ranging device by closing the switch S1 by means of the manual focus setting member 13. More specifically, the switch S1 is connected in parallel with a switch means S2 which is usually closed and opened in response to the focusing signal output from the ranging device. When the switch S1 is in the opened state, the magnet energizing current is broken in response to the focusing signal applied to the switch means S2. On the other hand, so long as the switch S1 remains in the closed state, the electro-magnet 7 continues to be energized thereby to hold the ratchet 8 in the disengaged position independently from the focusing signal from the ranging device. Switch means S3 serves for protecting a power source or an electric battery E from consumption. Therefore, the switch means S3 is adapted to be closed at the beginning of the depressing stroke of the shutter button (not shown) and opened at the end of the shutter release operation.

It should be appreciated that the present invention is never restricted to the illustrated embodiment but can be easily applied to other AF cameras in which the actuator ring 3 is provided integrally or interlocked with the focusing lens so as to move simultaneously along the optical axis with the latter. Further, a plurality of the manual focus setting members 13 and the switches S1 may be directly provided at every position with relation to lens barrel 10 at positions corresponding to desired focal distances to be set. In this case, the plurality switches S1 are of course connected in parallel with the magnet energizing circuit. Additionally, modifications in design will readily occur to those skilled in the art in respect of the arrangement to open the switch S1 in response to the operation of the manual focus setting member 13 thereby to inhibit the operation of electro-magnet 7 from being energized by the focusing signal.

For releasably setting the manual focus setting member 13 at desired positions, it is possible to employ a so-called ball-and-notch stopper mechanism known in the art.

What is claimed is:

1. In a photographic camera of the type having an automatic focus adjusting mechanism, an actuator member adapted to move simultaneously or in synchronism with movement of a focusing lens along its optical axis, an electromagnet operable in response to a signal from a ranging device to stop movement of said actuator member and said focusing lens; the improvement which comprises a stopper projection on said actuator member, a focus setting member manually movable from a position clear of the path of movement of said stopper projection to a position adapted to engage said stopper projection to limit movement of said actuator member, and switch means operable in response to movement of said focus setting member to the stopper projection engaging position to inhibit operation of said electromagnet.

2. The improvement as set forth in claim 1, wherein the positions of the focus setting member for limiting movement of the actuator member and for operating the switch means are variable.

3. The improvement as set forth in claim 2, and including a plurality of focus setting members and switch means.

* * * * *